(12) United States Patent
Birk

(10) Patent No.: US 6,425,346 B1
(45) Date of Patent: Jul. 30, 2002

(54) PROTECTING DEVICE FOR A TEAT LOCALIZER

(75) Inventor: Uzi Birk, Huddinge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/914,847

(22) PCT Filed: Mar. 1, 2000

(86) PCT No.: PCT/SE00/00408
§ 371 (c)(1),
(2), (4) Date: Sep. 4, 2001

(87) PCT Pub. No.: WO00/51417
PCT Pub. Date: Sep. 8, 2000

(30) Foreign Application Priority Data

Mar. 2, 1999 (SE) ............................................. 9900746

(51) Int. Cl.[7] ................................................. A01J 5/017
(52) U.S. Cl. .................................. 119/14.18; 119/14.08
(58) Field of Search ........................... 119/14.18, 14.47, 119/14.48, 14.08

(56) References Cited

U.S. PATENT DOCUMENTS

| | | | | |
|---|---|---|---|---|
| 3,387,551 A | | 6/1968 | Hughes | |
| 5,791,284 A | * | 8/1998 | van der Lely | ........... 119/14.02 |
| 5,915,331 A | * | 6/1999 | Kimm | ...................... 119/14.02 |
| 5,934,220 A | * | 8/1999 | Hall et al. | ................ 119/14.08 |
| 6,118,118 A | * | 9/2000 | van der Lely et al. | .... 119/14.08 |
| 6,234,109 B1 | * | 5/2001 | Andersson et al. | ...... 119/14.08 |
| 6,341,575 B1 | * | 1/2002 | Forsen | ..................... 119/14.08 |

FOREIGN PATENT DOCUMENTS

| | | |
|---|---|---|
| EP | 0 017 272 | 10/1980 |
| EP | 0 360 354 | 3/1990 |
| GB | 1138451 | 1/1969 |
| GB | 2 325 300 | 11/1998 |
| WO | WO 98/53357 | 11/1998 |

* cited by examiner

*Primary Examiner*—Yvonne Abbott
(74) *Attorney, Agent, or Firm*—Young & Thompson

(57) ABSTRACT

A protecting device (2) for a teat localizer, comprising a housing (4) having side walls, a top wall and a bottom wall, and being adapted to accommodate a localizer comprising an illuminator (20) and a viewing element (22). One (14) of the walls comprises a transparent portion providing an unimpeded light beam path for the localizer (20,22). The housing is provided with moisture deposition-preventing element for preventing moisture deposition on at least the inside surface of the transparent wall portion (14). The moisture deposition-preventing element comprises a partition wall (26) in the housing at a distance from the inside surface of the transparent wall portion. This partition wall and at least parts of the housing walls together define within the housing a through-flow gas chamber (30) having a gas inlet (28,32) and a gas outlet (36) allowing a moisture-removing gas flow (F) to be maintained past and close to the inside surface by connecting the gas inlet supply (34) of scavenging gas.

9 Claims, 1 Drawing Sheet

PROTECTING DEVICE FOR A TEAT LOCALIZER

TECHNICAL FIELD OF THE INVENTION

The present invention relates to a protecting device for a teat localizer. This device comprises a housing having walls, and being adapted to accommodate the localizer.

Such teat localizer is normally used to localize and establish the position of the udder and teats of a milkable animal in relation to an apparatus used to attach teat cups to the teats when the animal is to be milked. Such apparatus may be part of an automatic milking system and may comprise a milking robot arm.

In the context of the present invention the "milkable animal" may of course be a cow. However, any other milkable animal, such as a sheep, goat, horse or buffalo, may also be intended.

BACKGROUND OF THE INVENTION

WO 97/15900 (re: Teat Location for Milking) relates i.a. to a milking apparatus support guide arrangement comprising a light source and a video camera cooperating therewith to capture an image and provide an image signal. This signal is then analyzed (by processing means) and a target teat is selected and its position determined to home in said support and any supported milking apparatus to said target teat.

In one embodiment of said arrangement, the light source is a laser mounted in a block constituting a housing in which the camera is also mounted. The laser and the camera are received in a bore and an aperture, respectively, in said block. The block or housing does not provide any effective protecting device for the teat localizer (consisting of the laser and camera) in a difficult environment.

In WO 99/03064 there is disclosed an animal related apparatus for automatically performing an animal related operation, comprising a robot arm supporting a camera and a light source. There is not provided any protecting cover or housing for the light source and/or the camera and its lens.

OBJECTS OF THE INVENTION

A first object of the present invention is to provide a protecting device for a teat localizer, which device is able to secure proper function and operation of the localizer in a moist environment, when the function of the localizer is based on the principle of illuminating the teats to be localized and obtaining images thereof by some viewing means.

Another object is to avoid the emergence of moisture-related problems within a housing accommodating the localizer, especially problems relating to impeded or obscured light beam paths for the localizer.

SUMMARY OF THE INVENTION

In order to attain said objects, the protecting device according to the invention is so designed that at least one of said walls comprises a transparent or translucent wall portion providing an unimpeded or unobscured light beam path for the localizer, and the housing is provided with moisture deposition-preventing means adapted to prevent moisture deposition on at least the inside surface of the transparent wall portion.

The moisture deposition-preventing means preferably comprises a partition wall being arranged within the housing and spaced apart from the inside surface of the transparent wall portion, said partition wall and at least parts of the walls of the housing defining together within the housing a through-flow gas chamber having a gas inlet means and a gas outlet means allowing a moisture-removing gas flow to be maintained past and close to said inside surface.

To enhance the moisture removal effect of the gas flow within the through-flow gas chamber, suitable flow-guiding means (e.g. guide vanes, tubes or flow nozzles) may be arranged in said chamber. These flow-guiding means may be arranged to provide a more concentrated gas flow along by the inside surface (of the transparent wall portion) in the specific region thereof, where the viewing means should have a completely free line of sight through the transparent wall portion.

A suitable teat localizer may comprise an illuminator and a viewing means. The illuminator may be an ordinary source of light or a laser, and the viewing means may be a video camera (e.g. a CCD-camera or a digital camera) or a laser sensor. The illuminator and at least the lens of the viewing means should preferably be arranged within the through-flow gas chamber.

The gas inlet means may be an inlet opening in one of the housing walls, a gas supply channel or a hose, the outlet end of which communicating with the through-flow gas chamber. The gas outlet means may be an outlet opening in one of the gas chamber walls, preferably in the top wall adjacent to the housing side wall being provided with the transparent wall portion.

To establish a necessary and sufficient moisture-removing gas flow through the through-flow gas chamber, said inlet opening may be connectable to a positive pressure source (e.g. a compressed-air hose) or to an atmospheric gas supply. In the first case, the outlet opening may communicate directly with the interior of the room (e.g. the milking room) surrounding the protecting device housing; and in the second case, the outlet opening should be connectable to a negative pressure source.

When the protecting device according to the present invention is used in an automatic milking system comprising a milking robot, the housing of the protecting device may preferably be mounted on the robot arm.

DESCRIPTION OF THE DRAWING

The invention will now be further elucidated by means of the following description of a preferred embodiment shown on the enclosed drawing the sole FIGURE of which is a vertical section through such protecting device embodiment.

DETAILED DESCRIPTION OF THE PREFERRED EMBODIMENT

Figure 1:
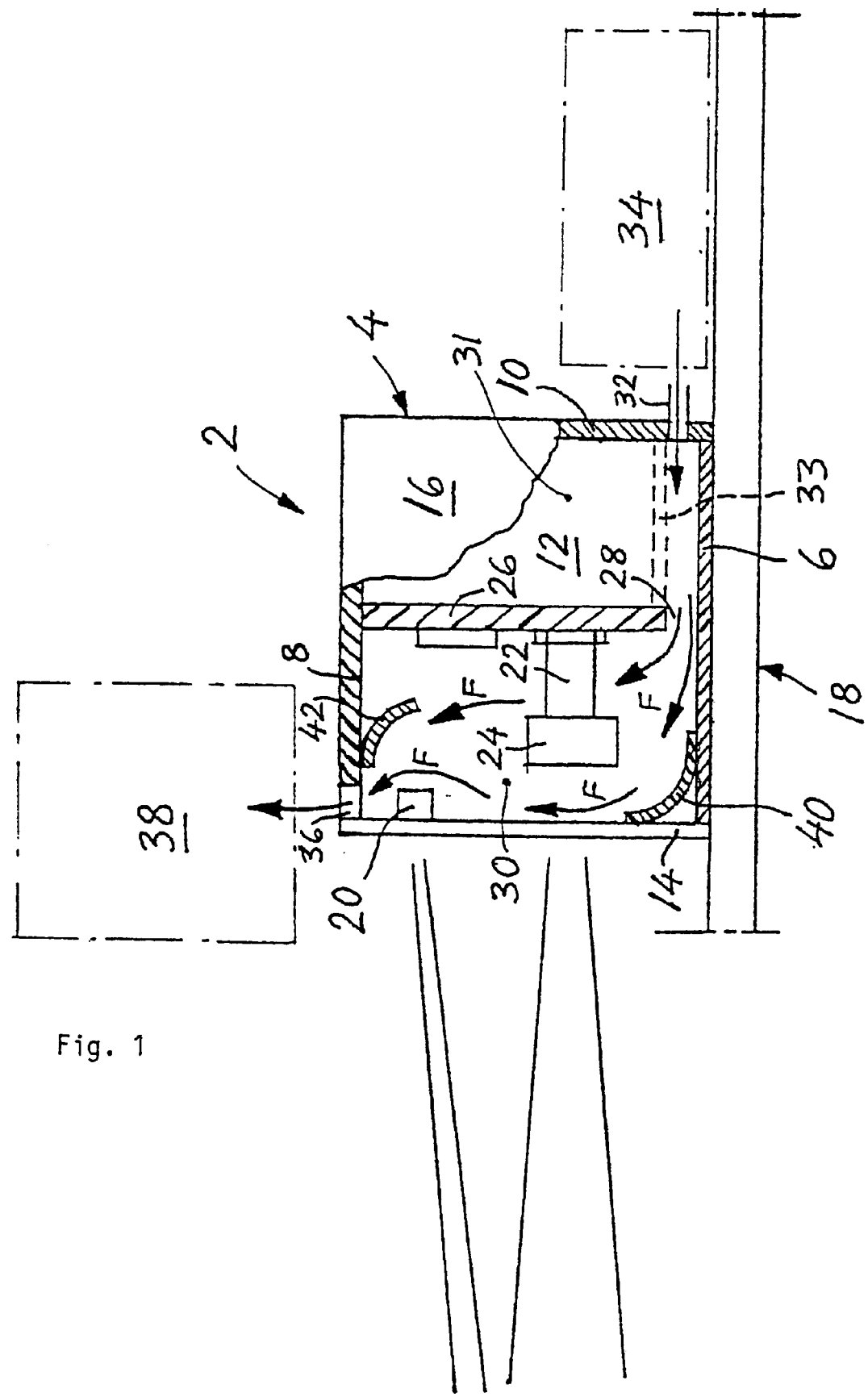

In the enclosed sole FIGURE, there is shown a protecting device 2 comprising a box-shaped housing 4 having a bottom wall 6, a top wall 8 and side walls 10,12,14 and 16. The housing 4 is mounted on a robot arm 18 of a milking robot being part of an automatic milking system (not shown). One of the walls, in this case the front wall 14, is a transparent wall of glass or a limpid plastic material in order to provide an unimpeded or unobscured light beam path for a teat localizer, which is accommodated in the housing 4 and adapted to view and localize the udder and teats of a milkable animal standing somewhere in front of the robot arm 18 in a milking parlour.

The device 2 is adapted to protect the teat localizer from the humid atmosphere in the milking parlour. The teat localizer comprises an illuminator 20 and a viewing means 22 mounted within the housing 4. In this particular embodiment, the illuminator 20 is a suitable laser and the viewing means 22 is a video camera with a lens 24.

The housing 4 is provided with moisture deposition preventing means for preventing moisture deposition on at least the inside surface of the transparent wall 14. Such moisture deposition might impede or obscure the light beam path through the transparent wall 14 for the localizer 20, 22, and must therefore be avoided.

The moisture deposition-preventing means comprises a partition wall 26 arranged within the housing 4 and extending sideways between the side walls 12 and 16 and downwards from the top wall 8 towards the bottom wall 6. However, the partition wall ends at a vertical distance from the bottom wall 6, thereby defining a slot-like through-flow opening 28 between a forward and a rear part of the interior of the housing 4. The forward part of the housing interior constitutes a through-flow gas chamber 30 having gas inlet means comprising the opening 28 and a gas inlet 32 down in the lower part of the rear housing wall 10. The inlet 32 is supplied with dry through-flow gas, e.g. scavenging air, from a source 34 of air or an air space outside the housing 4.

The partition wall 26 itself may be an electronics card, and additional electronic equipment and/or components may be mounted within a rear chamber 31 in the housing. This chamber may also have a bottom wall 33.

At the top of the chamber 30, adjacent to the inside surface of the transparent front wall 14, there is provided a gas outlet 36 comprising one or more outlet openings from said chamber. The gas outlet 36 is in communication with a gas recipient 38, which may be the milking parlour atmosphere outside the housing 4 or a specific gas-collecting vessel.

To render the moisture removal gas flow F more effective in the region of the inside surface of front wall 14, a pair of suitably designed flow guide vanes 40 and 42 are arranged in the chamber 30.

To obtain the intended gas flow F through the chamber 30, the air source 34 may preferably be a positive pressure source (e.g. source of pressurized air), whereby the outlet 36 may simply be an opening to the atmosphere surrounding the device 2, which atmosphere in that case constitutes recipient 38. If, on the other hand, the source 34 represents the atmosphere surrounding the device 2, the recipient 38 should be a negative pressure source ("suction source") in order to bring forth and maintain a gas flow F.

What is claimed is:

1. A protecting device (2) for a teat localizer, comprising a housing (4) having side walls, a top wall and a bottom wall, and being adapted to accommodate the localizer, characterized in that at least one (14) of said walls (6,8,10,12,14,16) comprises a transparent or translucent wall portion providing an unimpeded or unobscured light beam path for the localizer (20,22), and the housing being provided with moisture deposition-preventing means adapted to prevent moisture deposition on at least the inside surface of the transparent wall portion (14).

2. A device according to claim 1, characterized in that the moisture deposition-preventing means comprises a partition wall (26) being arranged within the housing (4) and spaced apart from the inside surface of the transparent wall portion (14), and that the partition wall and at least parts of the walls of the housing defining together within the housing a through-flow gas chamber (30) having a gas inlet means (28) and a gas outlet means (36) allowing a moisture-removing gas flow (F) to be maintained past and close to said inside surface.

3. A device according to claim 2, characterized in that flow-guiding means (40,42), are arranged in the through-flow gas chamber (30) and adapted to render the moisture-removing gas flow (F) more effective in the region of said inside surface.

4. A device according to claim 2, characterized in that the teat localizer comprises an illuminator (20), and a video camera (22) arranged in the housing (4), and that the illuminator and at least the lens (24) of the video camera are arranged in the through-flow gas chamber (30).

5. A device according to claim 2, characterized in that the tea localizer comprises a laser (20) and a laser sensor mounted in the through-flow gas chamber.

6. A device according to claim 2, characterized in that the teat localizer comprises a video camera (22), mounted within the housing (4), at least the lens (24) of the camera being arranged in the through-flow gas chamber.

7. A device according to claim 2, characterized in that the gas inlet means is an inlet opening (28) to the through-flow gas chamber (30), the inlet opening being connectable to a positive pressure source (34), and that the gas outlet means comprises at least one outlet opening (36) in one of the walls defining said gas chamber, preferably in the top wall (8) adjacent to the housing side wall (14) with the transparent wall portion.

8. A device according to claim 2, characterized in that the gas inlet means is an Inlet opening (28) to the through-flow gas chamber (30), the inlet opening being connectable to a source (34) of a gas of atmospheric pressure, and that the gas outlet means comprises at least one outlet opening (36) in one of the walls of said gas chamber, preferably in the top wall (8) adjacent to the housing side wall (14) with the transparent wall portion, the outlet opening (36) being connectable to a negative pressure source (38).

9. A device according to claim 1, characterized in that the housing (4) is mounted on a robot arm (18) of a milking robot being part of an automatic milking system.

* * * * *